Feb. 4, 1964
C. E. FLICKINGER ETAL
3,120,618
ERROR SIGNAL STORAGE SYSTEM
Filed Feb. 6, 1961
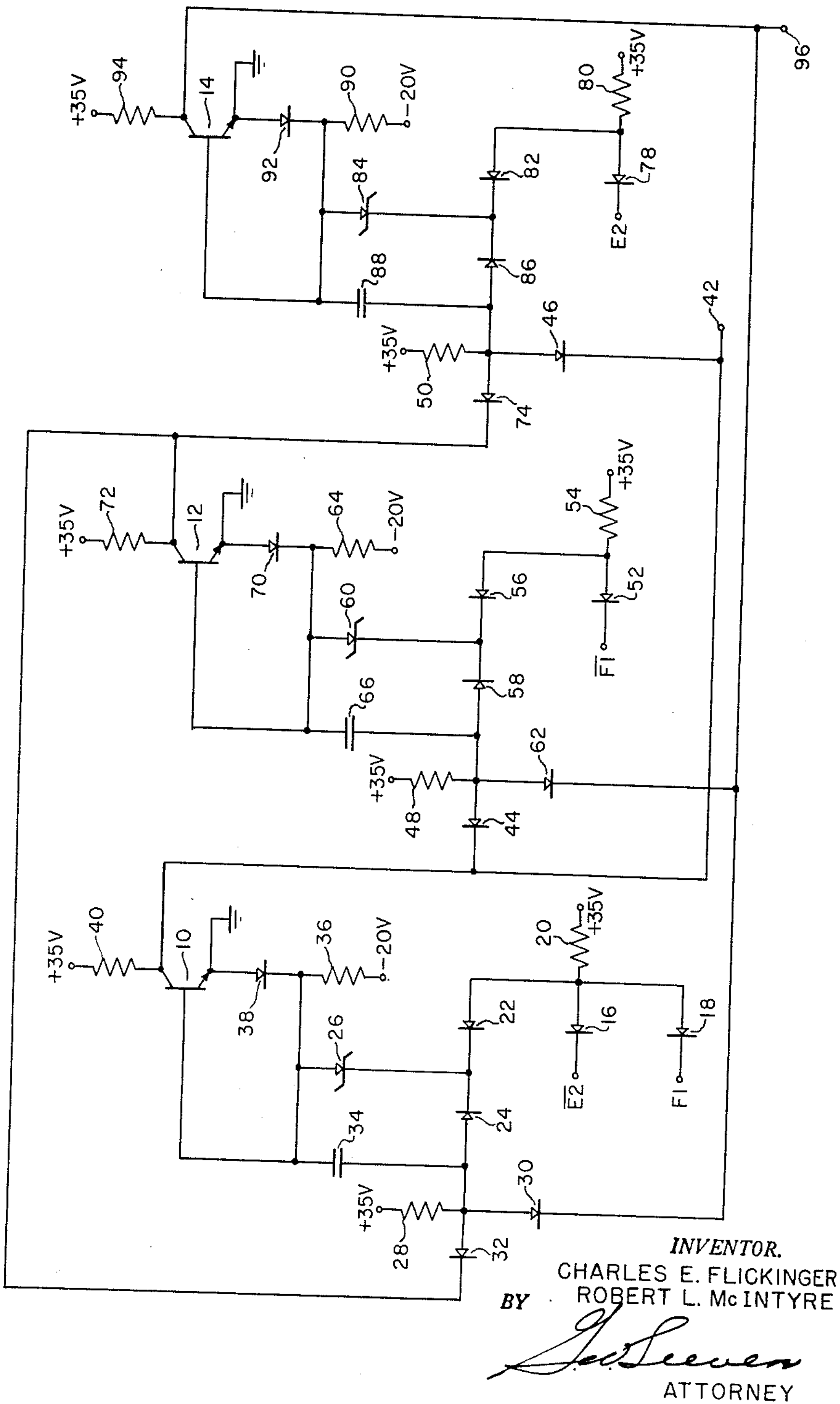
INVENTOR.
CHARLES E. FLICKINGER
ROBERT L. McINTYRE
BY [signature]
ATTORNEY

United States Patent Office 3,120,618
Patented Feb. 4, 1964

3,120,618

ERROR SIGNAL STORAGE SYSTEM

Charles Eugene Flickinger, Woodland Hills, Calif., and Robert L. McIntyre, Chappaqua, N.Y., assignors to General Precision, Inc., a corporation of Delaware Filed Feb. 6, 1961, Ser. No. 87,501
3 Claims. (Cl. 307—88.5)

The present invention relates to error signal storage systems, and it relates to more particularly to a new and improved error signal storage system suitable for controlling a servo mechanism.

In guidance systems for guiding vehicles of the type using computer-controlled servo mechanisms, it is usual to convert the digital outputs from the computer to analogue signals, and to use the analogue signals to control different servo mechanisms. These servo mechanisms, in turn, are mechanically coupled to the elements of the vehicle which are used for guiding purposes. In this manner, the guidance of the vehicle may be controlled by the outputs developed by the computer.

It is usual in guidance systems of the type mentioned above for the computer to control the different servo motors on a time-shared selective basis. Therefore, the control circuitry associated with each of the servo motors must be provided with some type of storage system. The storage systems associated with respective ones of the servo motors respond to the intermittent output signals from the computer to provide a continuous control for the respective servo motors.

It has been usual in the past for capacitors to be used to constitute the above mentioned storage systems. These capacitors respond to analogue error signals above and below a particular threshold to assume a charge which is more or less constant between the intervals of application of the error signals. These capacitor storage systems provide corresponding controls for their respective servo motors. The capacitor type of error signal storage system, however, is subject to inherent limitations, a principal one being the tendency for such systems to exhibit signal leakage.

It is an object of the present invention to provide an improved error signal storage system which is not subject to leakage and in which a set error signal state can persist indefinitely and until a change in the error signal sets the system to another state.

Another object of the invention is to provide such an improved type of error signal storage system which may be controlled to change storage states in an extremely short time interval, thereby permitting extremely fast commutation and switching rates in the vehicle guidance system in which the storage system may be incorporated.

Yet another object of the invention is to provide such an improved type of error signal storage system which is capable of developing sufficient power to drive its associated servo motor directly, so as to obviate the need for pre-amplifiers and the like.

The improved error-signal storage system of the invention, in the embodiment to be described, is in the form of a three-stable state transistorized circuit. The output from this circuit, as noted above, is capable of continuously driving its associated servo motor in a first direction when the circuit is in a first stable state; of continuously driving the servo motor in the opposite direction when the circuit is in its second stable state; and of causing the servo motor to remain stationary when the circuit is in its third stable state.

The error signal storage circuit discussed in the preceding paragraph responds to a "+1" error signal on a first input lead to assume its above mentioned first stable state, and to a "−1" error signal on a second input lead to assume its above mentioned second stable state. The circuit also responds to a "0" error signal on a third input lead to assume its above mentioned third stable state. These three inputs may be derived directly from logic circuitry coupled to the digital computer, and there is no need in the present system for digital-to-analogue converters.

The features of the invention which are believed to be new are particularly set forth in the claims. The invention itself, however, together with further objects and advantages, may best be understood by reference to the accompanying drawing in which the single figure represents the circuit diagram of one embodiment of the new and improved 3-state error-signal storage system of the invention.

The circuit shown in the drawing includes three transistors 10, 12 and 14. As illustrated, these transistors are of the NPN type, and their respective emitters are all connected to a point of reference potential, such as ground.

The circuit includes a first pair of input terminals which respond to a pair of terms $\overline{E2}$ and F1 from the computer. The computer is constructed and designed so that these terms are introduced to the circuit when it is required that the associated servo motor be driven in a particular direction. The terms $\overline{E2}$ and F1, therefore will be considered as constituting the "set +1" error signal. The term $\overline{E2}$ is introduced to the cathode of a diode 16 and the term F1 is introduced to the cathode of a diode 18. These diodes are connected as an "and" gate, and their anodes are connected to a resistor 20. The resistor 20 may have a resistance of 13 kilo-ohms, for example, and it is connected to the positive terminal of a 35 volt direct voltage source. A diode 22 also has its anode connected to the resistor 20, and the cathode of the latter diode is connected to the cathode of a diode 24 and to the cathode of a Zener diode 26.

The anode of the diode 24 is connected to a resistor 28, this resistor being connected to the positive terminal of the 35 volt direct voltage source and having a resistance, for example, of 13 kilo-ohms. A pair of diodes 30 and 32 have their anodes connected to the resistor 28. These latter diodes are connected as an "and" gate, and the diodes 22 and 24 form an "or" gate for connecting the latter "and" gate, and the "and" gate formed by the diodes 16 and 18, to the cathode of the Zener diode 26.

The anode of the Zener diode 26 is connected to the base of the transistor 10, and that anode is also connected to a capacitor 34 and to a resistor 36. The capacitor 34 is connected back to the anode of the diode 24. The resistor 36 may have a resistance of 68 kilo-ohms, and it is connected to the negative terminal of a 20 volt direct voltage source. A diode 38 has its anode connected to the grounded emitter of the transistor 10 and the cathode of the latter diode is connected to the base of that transistor.

The collector of the transistor 10 is connected to a resistor 40 which, in turn, is connected to the positive terminal of the 35 volt direct voltage source. The collector of the transistor 10 is also connected to an output terminal 42 of the system, and to the cathodes of a pair of diodes 44 and 46. The anode of the diode 46 is connected to a resistor 50. Each of these resistors may have a resistance of 13 kilo-ohms, and they are connected to the positive terminal of the 35 volt direct voltage source.

The computer is also assumed to introduce a term $\overline{F1}$ to a second input terminal of the illustrated figure. The term $\overline{F1}$ is true whenever the setting of the servo motor associated with the illustrated circuit is proper. Therefore, the $\overline{F1}$ term can be considered as the "set 0" error signal.

The term $\overline{F1}$ is applied to the cathode of a diode 52, the anode of which is connected to a resistor 54. The resistor 54 may have a resistance of 13 kilo-ohms, for example, and it is connected to the 35 volt direct voltage source. A diode 56 has its anode connected to the resistor 54, and the cathode of that diode is connected to the cathode of a diode 58 and to the cathode of a Zener diode 60. The anode of the diode 58 is connected to the anode of the diode 44, and to the anode of a diode 62. The cathode of the latter diode is connected back to the cathode of the diode 30.

The anode of the Zener diode 60 is connected to the base of the transistor 12, to a resistor 64, and to a capacitor 66. The resistor 64 may have a resistance of 68 kilo-ohms, for example, and that resistor is connected to the negative terminal of the 20 volt direct voltage source. The capacitor 66 is connected to the anode of the diode 58. The base of the transistor 12 is also connected to the cathode of a diode 70, the anode of which is connected to the grounded emitter of the transistor.

The collector of the transistor 12 is connected to a resistor 72 which, in turn, is connected to the positive terminal of the 35 volt direct voltage source. The collector of the transistor 12 is also connected to the cathode of the diode 32, and to the cathode of a diode 74. The anode of the diode 74 is connected to the resistor 50.

The illustrated circuit also has a third input terminal which receives a term E2 from the computer. The term E2 is true, whenever the servo motor associated with the illustrated circuit is to be driven in a direction opposite to the direction in which it is driven when the terms $\overline{E2}$ and F1 are true. Therefore, the term E2 may be considered as the "set −1" error signal.

The term E2 is applied to the cathode of a diode 78. The anode of the diode 78 is connected to a resistor 80 and to the anode of a diode 82. The resistor 80 may have a resistance of 13 kilo-ohms, for example, and it is connected to the positive terminal of the 35 volt direct voltage source.

The cathode of the diode 82 is connected to the cathode of a Zener diode 84 and to the cathode of a diode 86. The anode of the diode 86 is connected to a capacitor 88 which, in turn, is connected to the anode of the Zener diode 84 and to the base of the transistor 14. The base of the transistor 14 is also connected to a resistor 90 and to the cathode of a diode 92. The resistor 90 may have a resistance of 68 kilo-ohms, for example, and it is connected to the negative terminal of a 20 volt direct voltage source. The anode of the diode 92 is connected to the grounded emitter of the transistor 14.

The collector of the transistor 14 is connected to a resistor 94, to an output terminal 96, and to the cathodes of the diodes 30 and 62. The resistor 94 is connected to the positive terminal of the 35 volt direct voltage source.

In the circuit described above, the system is such that only one of the transistors 10, 12 or 14 is conductive at any one time. When the transistor 10 is conductive, for example, the resulting potential drop across the resistor 40 causes the output terminal 42 to assume a relatively low potential. When that occurs, the associated servo mechanism is controlled so that it is caused to rotate in a first particular direction. This rotation continues so long as the potential at the terminal 42 is at the relatively low level.

When the transistor 14 is conductive, on the other hand, the resulting current flow through the resistor 94 causes the potential drop across that resistor to produce a relatively low potential at the output terminal 96. When the output terminal 96 assumes its relatively low potential, the associated servo motor is caused to rotate in the opposite direction, and this rotation continues as long as the potential of the output termial 96 is at the relatively low level.

However, when the transistor 12 is rendered conductive, both the output terminals 42 and 96 are at a relatively low level.

However, when the transistor 12 is rendered conductive, both the output terminals 42 and 96 are at a relatively high potential. When that occurs, the associated servo motor is caused to remain stationary, and does not rotate in either direction.

Therefore, in response to the "set +1" error signal, represented by the terms $\overline{E2}$ and F1, the transistor 10 is rendered conductive, so that the associated servo motor is caused to rotate in the first direction. This rotation continues, until either the "set 0" error signal (as represented by the term $\overline{F1}$) or the "set −1" error signal (as represented by the term E2) is applied to the circuit. Should the latter condition occur, the transistor 14 is rendered conductive, so that the servo motor is rotated in the opposite direction. In each instance, when the setting of the servo motor is at the proper point, the term $\overline{F1}$ becomes true to render the transistor 12 conductive, so that both the transistors 10 and 14 are non-conductive and the servo motor is stationary.

Assume now that the transistors 12 and 14 are both non-conductive for the "set +1" condition. For that condition, the "and" gate formed by the diodes 30 and 32 is enabled, so that the transistor 10 is held in a conductive condition. This "set +1" conductive condition of the transistor 10 persists, regardless of the state of the signals introduced to the "and" gate formed by the diodes 16 and 18. Therefore, for this "set +1" condition, the associated servo motor rotates in the first direction.

Now, assume that an associated servo motor has been turned beyond the correct angular position; then, the term E2 will become true. This term causes the transistor 14 to be momentarily conductive so that the "and" gate formed by the diodes 30 and 32, is disabled. Both the transistors 10 and 12 now becomes non-conductive, so that the "and" gate formed by the diodes 46 and 74 is enabled for the "set −1" condition. This latter condition causes the transistor 14 to be held in a conductive state, regardless of the subsequent condition of the signal applied to the diode 78.

The associated servo motor is now rotated in the opposite direction. Assume now, that the servo mechanism is set to the proper point, the term $\overline{F1}$ becomes true to render the transistor 12 momentarily conductive for the "set 0" condition. The conductivity of the transistor 12 causes the "and" gate formed by the diodes 46 and 74 to become disabled, so that both the transistors 10 and 14 are now nonconductive. This latter state of the transistors 10 and 14 enables the "and" gate formed by the diodes 44 and 62, so that the transistor 12 is held conductive, regardless of the subsequent state of the signal introduced to the diode 52. This "set 0" condition, as noted above, causes the associated servo motor to remain stationary.

The illustrated error-signal storage system, therefore, can be triggered from one stable state to another by the introduction of a momentary input signal to the corresponding input terminal, or terminals. The error-signal storage system then will remain in that stable state, until another input signal is applied to another of its input terminals.

The invention provides, therefore, a new and improved error signal storage system, which is capable of being set to any one of three stable states, and which is further capable of remaining indefinitely in any one of its three stable states. As mentioned above, the improved circuit and system of the invention is advantageous, in that it is not subject to leakage; in that it may be triggered from one state to another in an extremely short time interval, of the order of two microseconds, for example; and in that it has high output power capabilities and can be used to drive an associated servo motor directly, and without the need for interposed power amplifiers.

We claim:

1. An error signal storage system including: a group of three transistors each capable of assuming a conductive state and a non-conductive state and each including a base electrode, an emitter electrode and a collector electrode; the emitters of said transistors being connected to a point of reference potential; a first group of three diode networks individually forming "or" gates and respectively coupled to the base electrodes of said transistors; input circuit means respectively coupled to the diode networks of said first group and responsive to corresponding input pulses for causing individual ones of said transistors to assume said conductive state; a second group of three diode networks individually forming "and" gates and respectively coupled to said diode networks of said first group, each of said diode networks of said second group being connected to the diode network of said first group associated with a different particular one of said three transistors and each being connected to the respective collector electrodes of the other two of said three transistors; said second group of three diode networks enabling any one of said three transistors set to its conductive state by an input pulse to remain in its conductive state and to cause each of the other two of said three transistors to be in its non-conductive state until another of said three transistors is set to its conductive state by a subsequent input pulse.

2. The storage system of claim 1 and which includes a plurality of impedance means respectively connecting the collector electrodes of said transistors to a source of exciting potential.

3. The storage system of claim 1 in which said transistors are of the NPN type and which includes a plurality of impedance means respectively connecting the collector electrodes of said transistors to a source of exciting potential.

References Cited in the file of this patent

UNITED STATES PATENTS

| | | |
|---|---|---|
| 2,860,259 | Odell et al. | Nov. 11, 1958 |
| 2,864,962 | Jensen | Dec. 16, 1958 |